(12) United States Patent  (10) Patent No.: US 7,044,547 B2
Sorrenti                    (45) Date of Patent: May 16, 2006

(54) SEATING APPARATUS

(76) Inventor: Mark Sorrenti, 3 Chevalier Crescent, Pulpit Point, Hunters Hill, New South Wales, 2110 (AU)

(*) Notice: Subject to any disclaimer, the term of this patent is extended or adjusted under 35 U.S.C. 154(b) by 0 days.

(21) Appl. No.: 10/493,435

(22) PCT Filed: Oct. 24, 2002

(86) PCT No.: PCT/AU02/01447

§ 371 (c)(1),
(2), (4) Date: May 26, 2004

(87) PCT Pub. No.: WO03/034873

PCT Pub. Date: May 1, 2003

(65) Prior Publication Data

US 2004/0245820 A1   Dec. 9, 2004

(30) Foreign Application Priority Data

Oct. 26, 2001  (AU) ..................... PR8517

(51) Int. Cl.
A47D 1/00  (2006.01)
A47D 1/10  (2006.01)

(52) U.S. Cl. ............... 297/250.1; 297/219.1; 297/219.12; 297/230.1; 297/230.13; 297/256.16; 297/452.25; 297/467; 297/487

(58) Field of Classification Search ........... 297/219.12, 297/219.1, 256.16, 250.1, 467, 485, 487, 297/488, 452.25, 230.1, 230.13, 352
See application file for complete search history.

(56) References Cited

U.S. PATENT DOCUMENTS

| | | | | |
|---|---|---|---|---|
| 731,778 A * | 6/1903 | Holtzmuller et al. | .. | 297/452.25 |
| 800,458 A * | 9/1905 | Martin | ................... | 297/452.25 |
| 1,004,589 A * | 10/1911 | Pridmore | ................ | 297/452.25 |
| 1,769,722 A * | 7/1930 | Sutton | .......................... | 297/485 |
| 2,652,883 A * | 9/1953 | Holtzendorff | ............. | 297/250.1 |
| D178,352 S * | 7/1956 | Free | .......................... | 297/467 X |
| 2,784,775 A * | 3/1957 | Madsen | ...................... | 297/467 |
| D181,975 S * | 1/1958 | Hail et al. | .......... | 297/452.25 X |
| 2,949,152 A * | 8/1960 | Hipps et al. | ............. | 297/467 X |
| 2,955,296 A * | 10/1960 | Zapolski | .............. | 297/250.1 X |
| 3,037,813 A * | 6/1962 | Lowe | .......................... | 297/467 |
| 3,423,773 A * | 1/1969 | Yamate | ..................... | 297/467 X |
| 3,572,830 A * | 3/1971 | Storer | ........................ | 297/467 |
| 3,992,057 A * | 11/1976 | Studebaker | .................. | 297/467 |
| 4,275,923 A * | 6/1981 | Molnar | ..................... | 297/250.1 |
| 4,463,984 A * | 8/1984 | Molnar | ..................... | 297/250.1 |
| 4,582,362 A | 4/1986 | Kassai | ..................... | 297/467 X |
| 4,607,882 A * | 8/1986 | Opsvik | .............. | 297/452.25 X |
| 4,969,689 A * | 11/1990 | Kricheldorf | ................. | 297/467 |
| 5,123,699 A * | 6/1992 | Warburton | ............... | 297/219.1 |
| 5,137,334 A * | 8/1992 | Cheney et al. | .............. | 297/467 |
| 5,551,749 A * | 9/1996 | Reher et al. | ........... | 297/219.12 |

(Continued)

FOREIGN PATENT DOCUMENTS

DE  3622226 A1 * 1/1987  .............. 297/250.1

(Continued)

Primary Examiner—Rodney B. White
(74) Attorney, Agent, or Firm—Ladas & Parry LLP

(57) ABSTRACT

A seating apparatus (10) for supporting a user I, includes a base (12). The base has a back rest (16) extending upwardly from a rear portion thereof. A pommel (26) is located at a front portion of the base. Leg receipt regions (14) extend forwardly from the base rear portion on either side of the pommel and are adapted with the pommel for causing the user's thighs to splay outwardly when received therein.

9 Claims, 4 Drawing Sheets

U.S. PATENT DOCUMENTS

| | | | |
|---|---|---|---|
| 5,599,063 A * | 2/1997 | Lister et al. | 297/467 X |
| 5,916,089 A * | 6/1999 | Ive | 297/219.12 X |
| 5,984,791 A * | 11/1999 | Fair et al. | 297/256.16 X |
| 6,033,019 A | 3/2000 | Hession-Kunz et al. | 297/250.1 |
| 6,315,363 B1 * | 11/2001 | Frear | 297/452.25 X |
| 6,378,947 B1 * | 4/2002 | Barber et al. | 297/452.25 |
| 6,709,052 B1 * | 3/2004 | Jalkanen | 297/452.25 X |
| 6,832,813 B1 * | 12/2004 | Tomas et al. | 297/250.1 |
| 6,877,805 B1 * | 4/2005 | Steadman | 297/250.1 X |
| 6,893,088 B1 * | 5/2005 | Kassai et al. | 297/250.1 |
| 2002/0135219 A1 * | 9/2002 | Rogers | 297/467 |
| 2003/0067198 A1 * | 4/2003 | Treen et al. | 297/250.1 |
| 2004/0004379 A1 * | 1/2004 | Kassai et al. | 297/250.1 |
| 2004/0084938 A1 * | 5/2004 | Tomas et al. | 297/250.1 |

FOREIGN PATENT DOCUMENTS

| | | | |
|---|---|---|---|
| DE | 3536206 A1 * | 4/1987 | 297/250.1 |
| EP | 154427 A2 * | 9/1985 | 297/250.1 |
| FR | 2615379 A1 * | 11/1988 | 297/467 |
| GB | 2277863 A * | 11/1994 | 297/250.1 |
| WO | WO 9614002 | 5/1996 | |

* cited by examiner

SEATING APPARATUS

FIELD OF THE INVENTION

The present invention relates to a seating apparatus for supporting a user, generally in an upright position on a floor. The invention has been developed primarily for users that have difficulty sitting on a floor, or on chairs, in an upright position (eg. babies and infants, elderly and unwell people, invalids etc) and will be described primarily in this context. However, it will be appreciated that the invention is not limited to this application, and can be used by a wide range of users in various seating applications.

BACKGROUND TO THE INVENTION

Various seating apparatus for supporting users in an upright position is known in the art.

U.S. Pat. No. 5,005,902 discloses a seat for a baby having a non-inflatable base and inflatable sidewalls which are intended to prevent a baby from falling over sideways when leaning thereon. However, this seat does not prevent the baby from falling forwardly (eg. on to their head).

U.S. Pat. No. 5,242,212 discloses a suspended infant posture-pod, which provides substantial surrounding support for an infant, but which is accordingly very restrictive to the infant's movements once positioned therein.

SUMMARY OF THE INVENTION

The present invention provides a seating apparatus for supporting a user, the apparatus including a base having:
  a back rest extending upwardly from a rear portion thereof;
  a pommel located at a front portion thereof; and
  leg receipt regions extending forwardly from the base rear portion on either side of the pommel and adapted with the pommel for causing the user's thighs to splay outwardly when received therein.

The applicant has surprisingly discovered that by splaying a user's thighs outwardly their stability in a seating apparatus is enhanced, especially when the seating apparatus is positioned on the floor (although also when the seating apparatus is incorporated into a chair etc).

Preferably the leg receipt regions splay outwardly from the base rear portion and extend beyond the pommel at the front portion of the base. By extending in this manner, a maximal length of each leg can be accommodated in a respective region, enhancing and ensuring the splaying effect.

Preferably the leg receipt regions are each concave into the base, to facilitate guidance of each leg and maintenance in a splayed orientation.

Preferably the leg receipt regions extend outwardly from a bottom receipt region defined by a concave recess located generally centrally between the backrest and pommel. Thus, a generally v- or splayed u-shaped receipt region can be defined by the combination of leg and bottom receipt regions and into which the user is easily guided and snugly received.

Typically upstanding peripheral sidewalls extend forwardly and outwardly from the base rear portion, each located along an outside length of a respective leg receipt region. The sidewalls help minimise outside (ie. lateral) falling of a user, although this is in any case substantially addressed by the outward splaying of a user's thighs.

Preferably each sidewall tapers downwardly in height from the top of the backrest to a level adjacent to the front portion of the base. This frees up a user's arms for movement when sitting in the apparatus. Preferably an upper surface of each sidewall is scalloped concavely to enable movement thereover of a respective adjacent user's arm. This scalloping provides for further freedom of movement of each arm of a user.

Preferably the backrest has a laterally extending concave region defined therein adjacent to the base, for receipt of a user's lower back therein. The provision of this concave region further assists in the user's sitting in an upright orientation, and maximises the comfort of a user in the apparatus.

Typically the base has a generally flat underside for location on a floor, in which case a user's legs can extend outwardly such that their feet sit on or adjacent to the floor. However, the base can form part of a chair, with legs etc. extending downwardly from an underside of the base.

Preferably the base has an upper seating surface that is continuous with the backrest, pommel and leg receipt regions, typically formed from a smooth (and in some cases deformable) material to maximise user comfort.

Typically the base is generally trapezoidal in plan view.

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Figure 1:
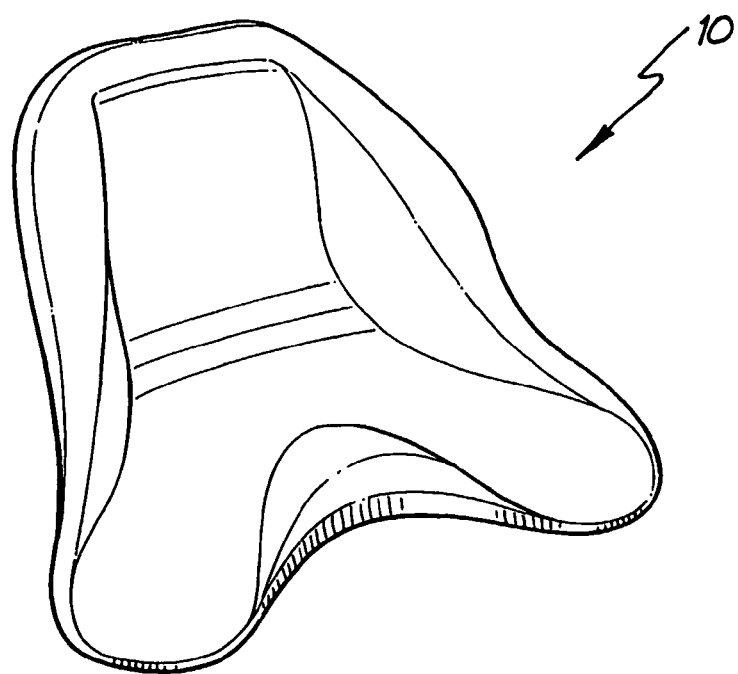
FIGS. 1, 2 and 3 show three different perspective views of a preferred seating apparatus in accordance with the present invention.
Figure 2:
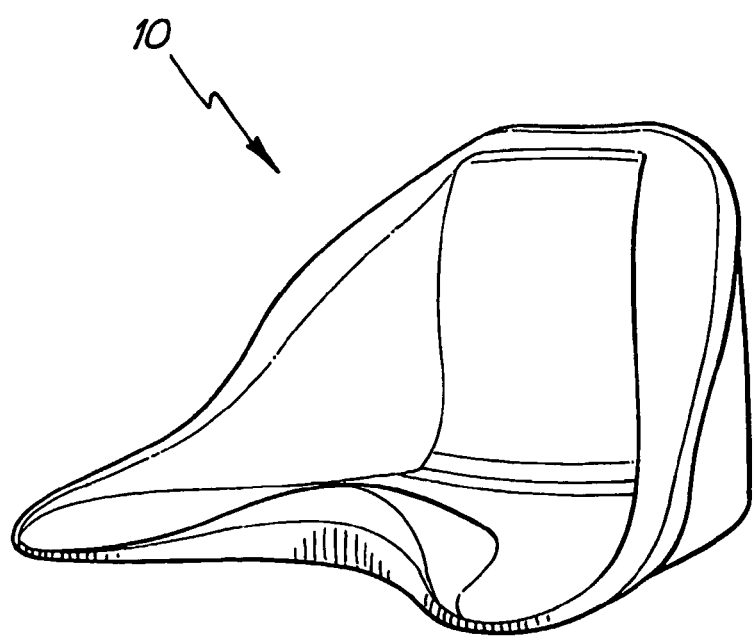
Figure 3:
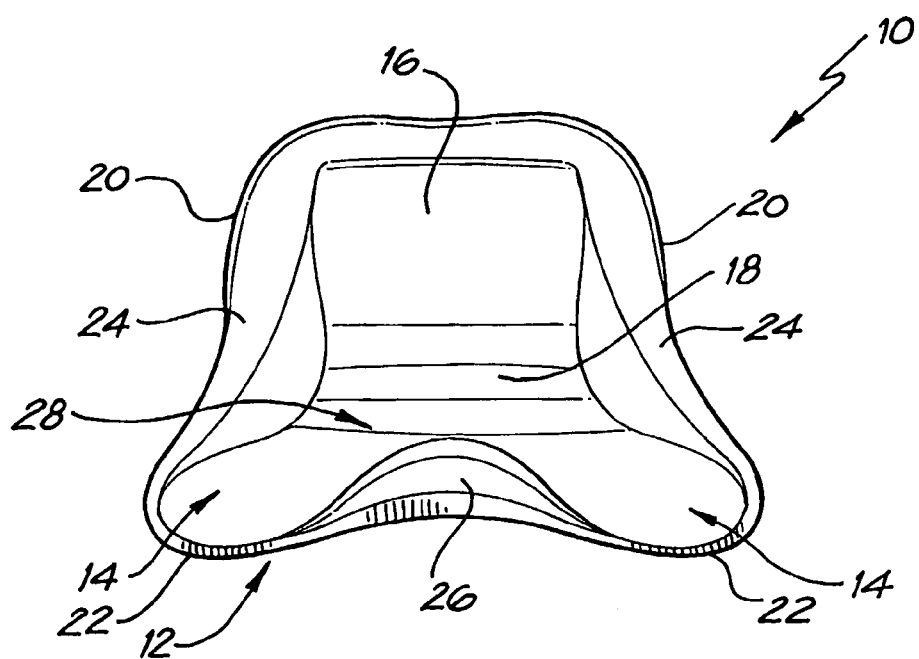

Referring to the drawings, a seating apparatus in accordance with the present invention is shown in the form of a floor seat 10. The floor seat includes a base 12 in which is defined a pair of concave thigh receiving regions 14.

Extending upwardly from a rear of the base 12 is a back rest 16 having a lower laterally scalloped (concave) region 18 formed therein and into which a lower part of the user's back (and spine) is received in use.

A pair of side walls 20 extend forwardly from the back rest 16 and taper downwardly towards front lobes 22 of regions 14 as shown. Each side wall 20 also has a scalloped (concave) arm region 24 formed therein, over which a user's arms can extend (and upon which they can rest) to provide for freedom of movement of the user's arms.

The base further includes a pommel region 26 at a central front portion thereof, which is raised up with respect to the regions 14 and with respect to a scalloped (concave) central bottom receiving region 28. Thus the thigh receiving regions 14 and the bottom receiving region 28 combine to define a generally v- or splayed u-shaped channel, which is in part bordered by the pommel 26, by the side walls 20 and by the back rest 16.

Figure 4:
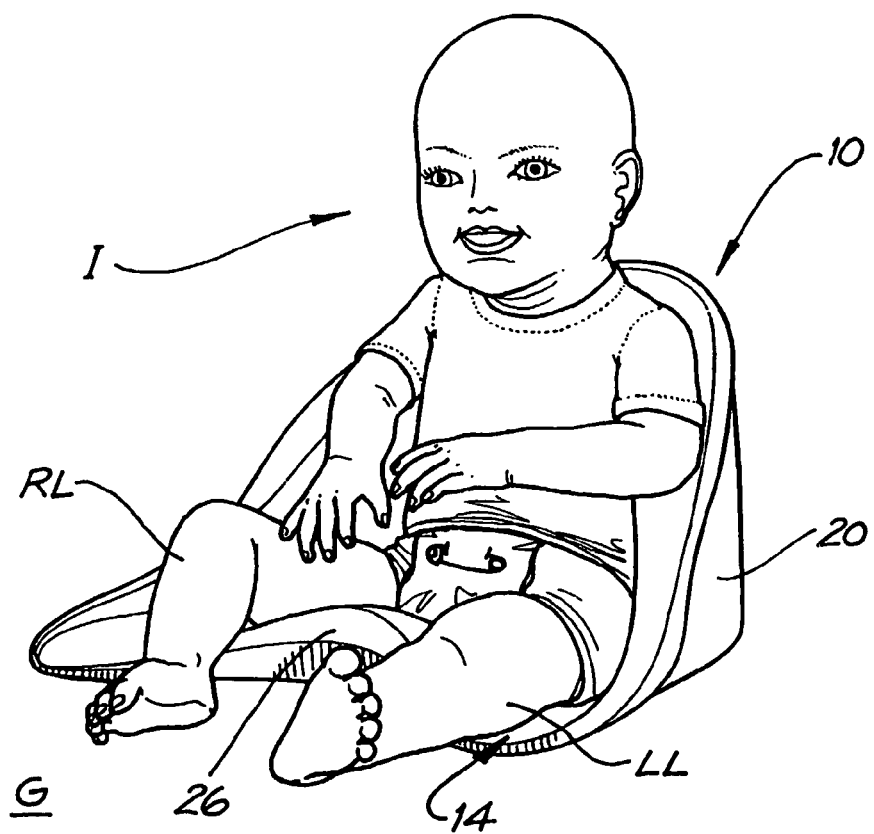
FIG. 4 shows a perspective view similar to FIG. 2 but with a user seated in the apparatus.

This channel is designed such that when a user (eg. an infant I as shown in FIG. 4) is seated therein, the regions 14, in conjunction with the pommel 26 cause the user's thighs to be splayed outwardly, and this provides for a broad and balanced contact between the seat and the user's bottom and thigh undersides, stabilising the user in an upright orientation. This stability can be further enhanced when the maximum extent of the user's legs are aligned in respective regions 14 (eg. such as the user's left leg LL in FIG. 4).

The tapered side walls 20 also allow for a user to bend their leg at the knee and rest the outside of the leg against the adjacent side wall (such as the user's right leg RL in FIG. 4).

Typically the lobes 22 of the regions 14 extend sufficiently far forward such that a maximal length of the user's leg can be received therein. However, to develop the strength and coordination of a user's legs and feet (especially for babies and infants) typically the user's feet extend beyond the lobes 22 and can be engaged with the surrounding ground G as shown in FIG. 4.

FIG. 4 also shows that the user is supported by adjacent side walls at their hips, and the lower part of the user's back and spine is received into scalloped region 18. The user can rest their arms and also move them over the side walls 20 as provided by the scalloped arm regions 24.

The user is prevented falling forwardly by the pommel region 26 engaging against the pubic region of the user and so, in combination, the thigh receiving regions 14, central bottom region 28, pommel region 26, back rest 16 (including scalloped region 18), and side walls 20 provide for a snug and well supported upright user configuration whilst still allowing for freedom of arm movement and leg bending, feet movement, head and neck movement etc.

Whilst an infant is depicted in FIG. 4, the chair can be modified to suit other shaped users. This can be achieved by scaling the seat size up or down and by adopting one of a number of different scalloped region sizes by varying the size of pommel 26, as shown in FIG. 6, to accommodate the different sized users.

Typically the floorseat 10 is formed from a flexible but structurally stable plastic and can be injection, rotation or blow-moulded etc. The floor seat can be covered by and/or partially formed with a deformable polymeric material, such as a polymeric foam, to facilitate user comfort.

Typically the underside of the floor seat is flat for siting flush on a floor. However, the seat can be incorporated into a chair, in which case legs or other supporting structures can extend downwardly from an underside of the seat 10. The seat can also be incorporated into other seating mechanisms, such as car seats, capsules etc. or placed on top of and fastened or incorporated into seats in all types of vehicles. Safety belts can also be fitted to the seat.

Figure 5:
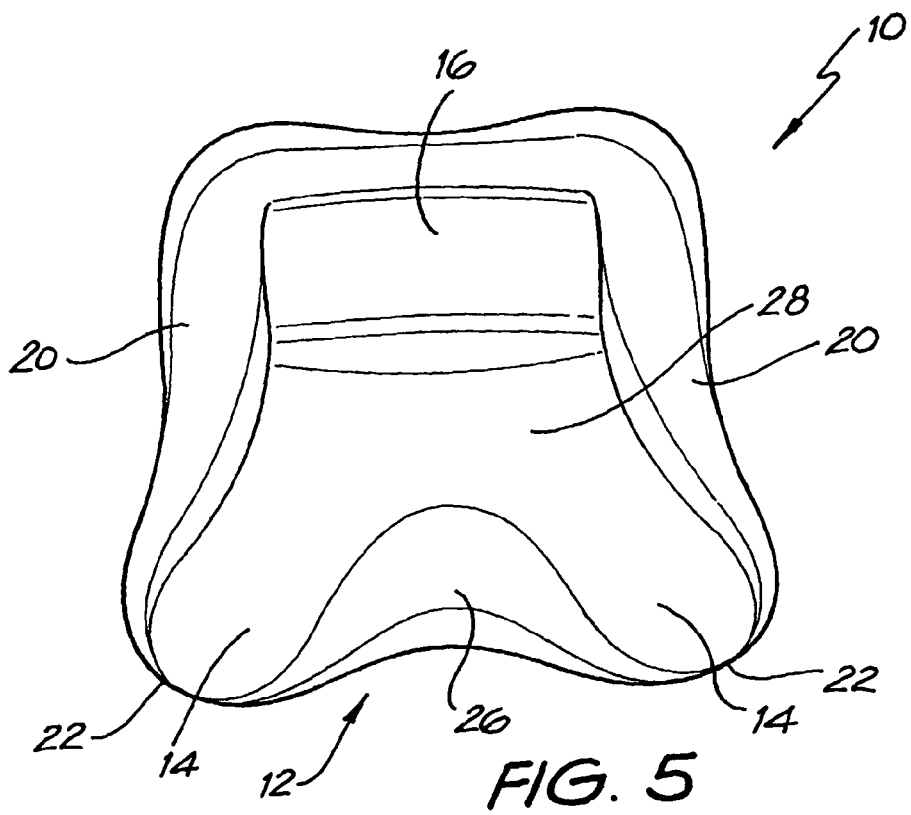
FIG. 5 shows a plan view of the apparatus of FIGS. 1 to 4.
Figure 6:
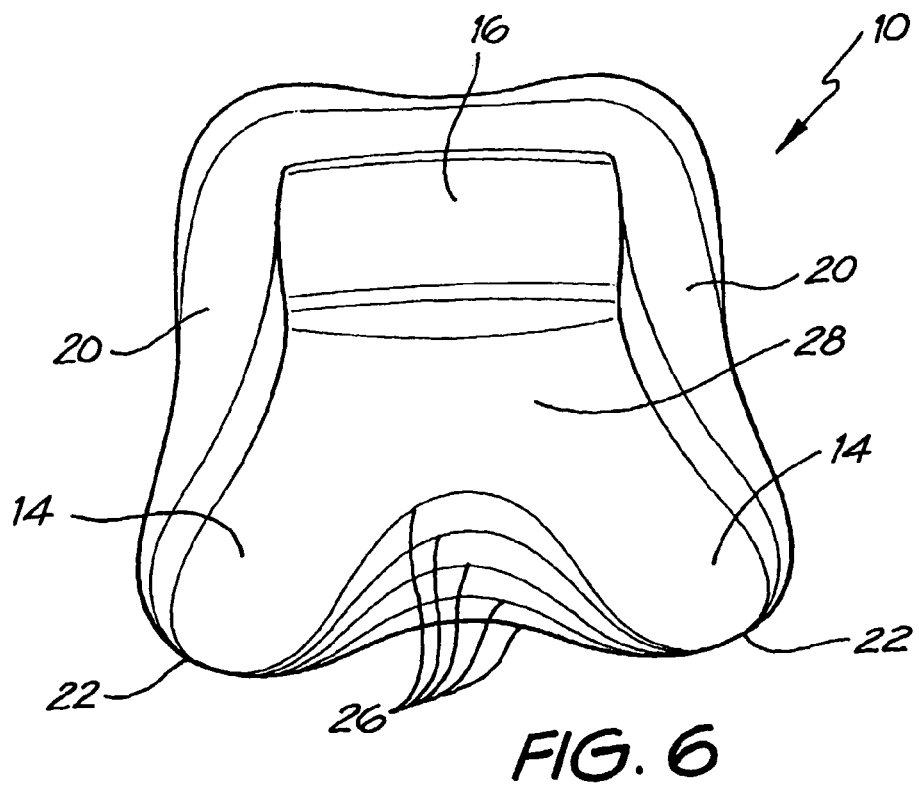
FIG. 6 shows a similar plan view to FIG. 5, but illustrating schematically a number of different pommel configurations.
Figure 7:
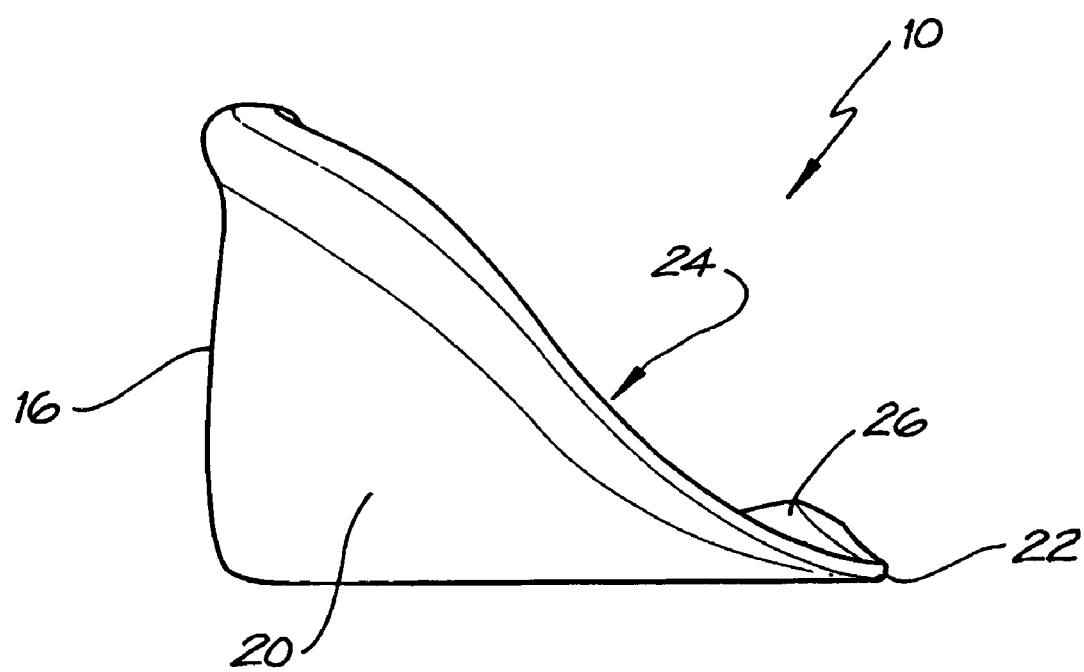
FIGS. 7 and 8 show side and rear elevations of the preferred seating apparatus of FIGS. 1 to 5.
Figure 8:
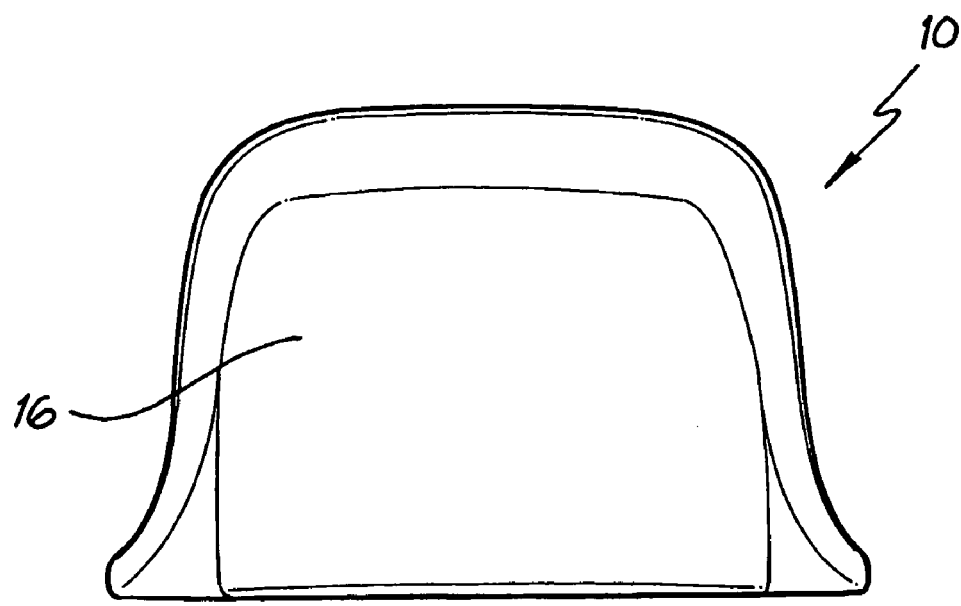

It will be seen from FIGS. 5 and 6 that the seat has a generally trapezoidal configuration in the seating region, which has been observed to provide for seating stability and allow for upright seating in accordance with the invention.

A number of advantages flow from the configurations described above.

- A user can be seated on a floor etc. and oriented into an upright configuration, to assist with strength development, motor skills and general ease of viewing.
- No strapping or frontal bracing etc. is required to maintain the user in the upright position, freeing their arms and legs for use, and for strength and coordination development etc.
- The seat provides a cradle to the user, enhancing their comfort and improving their posture.
- The seat can be used to train babies and infants in the intermittent stage between lying and sitting, and places such infants in an orientation where they may be easily fed, offered toys, and can readily view their surroundings etc.
- The seating apparatus can be used by a wide range of users, including babies, infants, elderly persons, invalids, people recovering from illness or injury (eg. where they weakened) etc.

Whilst the invention has been described with reference to a number of preferred embodiments, it should be appreciated that the invention can be embodied in many other forms.

What is claimed is:

1. A seating apparatus for supporting a user, the apparatus including a base having:

a back rest extending upwardly from a rear portion thereof;

a pommel located at a front portion thereof; and leg receipt regions extending forwardly and divergently from the base rear portion on either side of the pommel and adapted with the pommel for causing the user's thighs to splay outwardly when received therein wherein upstanding peripheral side walls extend forwardly and outwardly from the base rear portion, each located along and outside the length of a respective leg receipt region;

wherein each side wall tapers downwardly in height from the top of the back rest to a level adjacent to the front portion of the base.

2. Apparatus as claimed in claim 1 wherein the leg receipt regions splay outwardly from the base rear portion and extend beyond the pommel at the front portion of the base.

3. Apparatus as claimed in claim 1 or claim 2 wherein the leg receipt regions are each concave into the base.

4. Apparatus as claimed in claim 1 or claim 2 wherein the leg receipt regions extend outwardly from a bottom receipt region defined by a concave recess located generally centrally between the back rest and pommel.

5. Apparatus as claimed in claim 1 or claim 2 wherein an upper surface of each side wall is scalloped concavely to enable movement thereover of a respective adjacent user's arm.

6. Apparatus as claimed in claim 1 or claim 2 wherein the back rest has a laterally extending concave region defined therein, adjacent to the base, for receipt of a user's lower back therein.

7. Apparatus as claimed in claim 1 or claim 2 wherein the base has a generally flat underside for location on a floor.

8. Apparatus as claimed in claim 1 or claim 2 wherein the base has an upper seating surface that is continuous with the back rest, pommel and leg receipt regions.

9. Apparatus as claimed in claim 1 or claim 2 wherein the base is generally trapezoidal in plan view.

* * * * *